(12) United States Patent
Dudek et al.

(10) Patent No.: US 6,761,318 B2
(45) Date of Patent: Jul. 13, 2004

(54) CONTAINER AND PROCESS FOR MONITORING AND RECORDAL OF PRODUCT INFORMATION

(75) Inventors: David Robert Dudek, Katy, TX (US); Peter Saniford, St. Albans (GB)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/843,106

(22) Filed: Apr. 25, 2001

(65) Prior Publication Data

US 2002/0088864 A1 Jul. 11, 2002

(30) Foreign Application Priority Data

Apr. 25, 2000 (EP) .............................................. 00303431

(51) Int. Cl.[7] .............................................. G06K 19/06
(52) U.S. Cl. ...................................... 235/487; 235/492
(58) Field of Search ................................ 235/487, 492, 235/493

(56) References Cited

U.S. PATENT DOCUMENTS

| 3,167,210 | A | | 1/1965 | Carney, Jr. | 220/63 |
|---|---|---|---|---|---|
| 3,966,091 | A | | 6/1976 | Bencic | 222/129.1 |
| 4,006,841 | A | | 2/1977 | Alticosalian | 222/42 |
| 4,077,182 | A | | 3/1978 | Papaluca | 53/109 |
| 4,193,540 | A | * | 3/1980 | Dougados et al. | 235/454 |
| 4,236,559 | A | * | 12/1980 | Archbold | 224/610 |
| 4,330,066 | A | | 5/1982 | Berliner | 215/1 C |
| 4,809,342 | A | * | 2/1989 | Kappner | 382/142 |
| 4,832,096 | A | | 5/1989 | Kohlbach | 141/114 |
| 4,929,818 | A | * | 5/1990 | Bradbury et al. | 235/381 |
| 4,934,567 | A | | 6/1990 | Vahjen et al. | 222/136 |
| 5,067,636 | A | * | 11/1991 | Pfeiffer et al. | 222/105 |
| 5,285,815 | A | | 2/1994 | Henry et al. | 137/595 |
| 5,347,453 | A | * | 9/1994 | Maestre | 705/2 |
| 5,429,263 | A | | 7/1995 | Haubenwallner | 220/404 |
| 5,516,007 | A | | 5/1996 | Larson | 222/105 |
| 5,685,435 | A | | 11/1997 | Picioccio et al. | 209/677 |
| 5,758,571 | A | | 6/1998 | Kateman et al. | 99/455 |
| 5,774,053 | A | * | 6/1998 | Porter | 340/568 |
| 5,955,132 | A | | 9/1999 | Spica et al. | 426/399 |
| 5,980,501 | A | * | 11/1999 | Gray | 604/408 |
| 5,996,316 | A | | 12/1999 | Kirschner | 53/443 |
| 5,996,824 | A | | 12/1999 | Grant et al. | 215/2 |
| 5,997,236 | A | | 12/1999 | Picioccio et al. | 414/403 |
| 6,092,731 | A | * | 7/2000 | Smith | 235/487 |
| 6,259,654 | B1 | * | 7/2001 | de la Huerga | 368/10 |
| 6,332,481 | B1 | * | 12/2001 | Shinada et al. | 141/18 |
| 6,335,907 | B1 | * | 1/2002 | Momich et al. | 368/10 |
| 6,391,136 | B1 | * | 5/2002 | Stickelbrocks | 156/249 |
| 6,426,699 | B1 | * | 7/2002 | Porter | |
| 6,578,763 | B1 | * | 6/2003 | Brown | 235/435 |

FOREIGN PATENT DOCUMENTS

| DE | 27 14 919 A1 | 10/1977 | ........... B65D/43/02 |
|---|---|---|---|
| DE | 37 27 789 A1 | 3/1988 | ........... B65D/47/20 |

(List continued on next page.)

Primary Examiner—Mark Tremblay

(57) ABSTRACT

A reusable container which comprises therein one or more electronically and/or optically readable identification means; and a process for the monitoring and recordal of product information during the filling or refilling of a reusable container, which comprises reading an electronic and/or optical identification means on said reusable container and storing the information obtained therefrom in a storage means that is capable of being interrogated to extract and optionally process said information. The information can include customer data, such as buying frequency, quantity, product type, produce customisation characteristics, and/or other consumer related data.

23 Claims, 2 Drawing Sheets

FOREIGN PATENT DOCUMENTS

| | | | | |
|---|---|---|---|---|
| DE | 39 22 779 A1 | 1/1991 | | B65B/3/04 |
| DE | 44 39 914 A1 | 5/1996 | | B65D/23/08 |
| DE | 196 07 255 A1 | 8/1997 | | B65B/3/00 |
| DE | 198 13 842 A1 | 9/1999 | | B65G/47/49 |
| DE | 299 13 528 U1 | 1/2000 | | G07F/17/18 |
| DE | 199 36 645 A1 | 4/2000 | | B67D/5/34 |
| EP | 0 358 053 A2 | 3/1990 | | B65D/77/06 |
| EP | 0 479 113 A1 | 4/1992 | | B67D/1/00 |
| EP | 0 499 918 A2 | 8/1992 | | E21D/11/00 |
| EP | 0501015 A1 | 9/1992 | | B65D/77/06 |
| EP | 0 528 394 A1 | 2/1993 | | B65D/77/06 |
| EP | 0 649 121 A2 | 4/1995 | | G07F/17/16 |
| FR | 1 180 592 | 6/1959 | | |
| GB | 2188906 A | 10/1987 | | B67D/5/56 |
| GB | 2244977 A | 12/1991 | | B67D/5/56 |
| WO | WO 94/24010 | 10/1994 | | B65D/25/00 |
| WO | WO 96/01227 | 1/1996 | | B67D/5/56 |
| WO | WO 97/02898 | 1/1997 | | B05B/7/28 |
| WO | WO 97/18538 | 5/1997 | | G07F/13/08 |
| WO | WO 00/03944 | 1/2000 | | B67D/1/08 |

* cited by examiner

CONTAINER AND PROCESS FOR MONITORING AND RECORDAL OF PRODUCT INFORMATION

This application claims priority to the foreign application filed on Apr. 25, 2000, in Europe and having a serial number of 00303431.1.

FIELD OF THE INVENTION

The present invention relates to reusable containers having electronically and/or optically readable identification means and to a process for the monitoring and recordal of product information during filling or refilling the containers.

BACKGROUND OF THE INVENTION

Containers for the purchase, transportation and dispensing of products are well known in the art and are in widespread use.

Such containers are available in a wide variety of shapes and forms. They may be assembled from a wide variety of components, and may be manufactured from a wide variety of materials.

Containers may generally be divided into two distinct classes.

The first class is non-reusable containers, that is to say, where the container is employed as a single use component and is disposed of when emptied of its contents.

The second class is reusable containers, that is to say, where the container is returned to the point of sale or dispense to be refilled once emptied of its contents. This process may be repeated many times, and the container may be refilled with contents different to those previously in the container.

Typically, a reusable container is designed to contain, transport and dispense a product according to the product properties and intended use.

A reusable container typically has features that enable the container to survive the process of return and reuse.

Typically, reusable containers are designed with the minimal use of materials and components in order to provide a minimal cost.

Although the use of non-reusable containers has some advantages in that it is easy to implement within the constraints of the current distribution and retail system, the use of non-reusable containers is less environmentally friendly and also makes the inherent cost of this method more expensive, than the refill method described above.

Reusable containers are used, for example, in the beverage and dairy industries wherein empty containers are returned to the vendor/product manufacturer for subsequent cleaning and refilling of said containers on the production line.

Containers in the art may typically contain bar codes as a means of identification. Such bar codes provide the retailer with a means of stock control and a method of automatic pricing control, that is to say, the retailer is no longer required to affix individual pricing stickers to products. However, it will be appreciated that within a certain class of products the bar code identification will be identical and therefore it is not possible to vary the code within that class over time in order that certain products within the class may carry different information to others.

The use of reusable containers in an environment wherein the user or consumer directs the refilling process has a number of inherent problems. For example, the user or consumer may attempt to refill the reusable container with a product type different to that originally held in the container; the user or consumer may attempt to fill the container beyond its capacity; the user or consumer may not correctly position the container in the filling point of the dispensing machine prior to commencing the filling process.

By "dispensing machine" in the present invention is meant a machine that dispenses product in response to one or more selections that are input into the machine by the consumer or user. Such a system may be operated by coin, token, card, or other suitable means.

A further problem that may be encountered is that whilst the consumer or user may refill the reusable container with an identical product type, said product type may contain minor variations over the original product held in the reusable container, for example, with respect to fragrance, colour, etc. In such a situation, it is beneficial to both the retailer and the consumer or user that the reusable container comprises functionality that allows the product characteristics at any given time, as well as the product history over time as the bottle undergoes a series of refill cycles, to be monitored and recorded. Thus, this data will become different for individual reusable containers as time progresses, in spite of said containers originally containing the same product.

SUMMARY OF THE INVENTION

According to the present invention there is provided a reusable container, which comprises therein one or more electronically and/or optically readable identification means.

According to the present invention, there is further provided a process for the monitoring and recordal of product information during the filling or refilling of a reusable container, which comprises reading an electronic and/or optical identification means on said reusable container and storing the information obtained therefrom in a storage means that is capable of being interrogated to extract and optionally process said information.

Identification means in the form of, for example, electronic tags allow a reader or scanner to read data from the tag and/or write data to the tag. The reusable container then essentially becomes "intelligent".

By "intelligent" in the present invention is meant that the electronic tag may allow, for example, collection of specific consumer data, such as buying frequency, quantity, product type, product customisation characteristics; direct billing of the consumer instead of using coins, notes/bills, or a credit or debit card at the filling point of the dispensing machine or at the check-out of the retail store; simplification of the dispensing machine by identifying the size of the reusable container being used and signalling that the reusable container is correctly positioned; refilling control measures by only allowing dispensing of the correct product type from the dispensing machine into the reusable container; identification of the consumer or user in order to provide a personalised greeting and to offer the choice of repeating previous customisation preferences; better asset management for the retailer, that is to say, the tag may monitor the reusable container's product history, its use record, etc; management of the supply chain, that is to say, optimising supply chain responsiveness.

Said identification means may be of any kind commonly used in the art. In a preferred embodiment, said identification means may be of one or more types selected from resistance tagging, optical tagging and transponder tagging, depending upon the requirements for the monitoring and recording of information.

Resistance tagging is a method wherein the reusable container may be identified by a dispensing machine through electronic resistance. A circuit, which is moulded into the reusable container during manufacture, has a specific electrical resistance and therefore may identify the size and intended use of the reusable container. The dispensing machine is programmed to function only when it detects the specific band of electronic resistance that is acceptable.

Optical tagging is a method wherein a series of slots are moulded into the reusable container. Said slots are detected by an optical reader. The slots are moulded in such a way as to provide identification of the reusable container by the dispensing machine and thus to ensure that only the correct product type may be refilled into the container.

Transponder tagging is a method wherein a transponder chip is attached to the reusable container. Said chip may be read by the dispensing machine, thereby preventing the cross-contamination caused by refilling the reusable container with the incorrect product type.

The storage means for information in the present invention, may be at a location remote from the container or in a location on the container.

The design of the reusable container may include provision for ease of handling in use, such as and by way of example only, handles integral to the container design or as an additional component or components; flexible members or components such as straps, webbing, collars; additional grip points around the neck or base to allow the user access to multiple handling points; methods such as straps or clips, whereby the container may be "worn" by the user or hung from convenient location points to enable the container to be used on the move or in locations where there are no appropriate surfaces for storage.

The design of the reusable container may be of any scale or size that is relevant to the product or the product use.

In a preferred embodiment of the present invention, at least a portion of the reusable container will be of a collapsible nature.

By "collapsible" in the present invention, is meant any action that results in a reduction in size and volume of the reusable container.

The collapsible nature of the reusable container improves its portability when empty.

By "filling point" in the present invention, is meant the region of the dispensing machine wherein the reusable container is placed in order for filling or refilling to occur.

The reusable container may be made from any material, and in any shape or configuration.

The reusable container may be manufactured by employing any technique commonly used in the art.

In one embodiment of the present invention, said reusable container may be manufactured from a plastic material. As such, said reusable container may be manufactured by any conventional forming process.

Suitable plastics materials include any appropriate to the requirements of the product including, by way of example, Polyethylene Terephthalate (PET), Polypropylene (PP), Polyethylene (PE), High Density Polyethylene (HDPE), Polyvinyl Chloride (PVC) and barrier laminates such as PET/NYLON/PET and PP/BAREX®/PP etc. (BAREX® is a trade mark of BP Amoco plc).

In a preferred embodiment of the present invention, said reusable container may be manufactured by an extrusion or injection blow-moulding process.

The reusable container generally has a bottom wall, peripheral side walls, and an upper portion comprising one or more dispensing points. Said peripheral side walls are preferably of a collapsible nature. The terms "bottom", "side" and "upper" are used to identify the positions of those portions of the container when it is in its normal orientation in use.

It will be appreciated by one skilled in the art, that for convenience said bottom wall and/or upper portion may also be of a collapsible nature.

The upper portion may be an integral part of the reusable container, or it may be securely sealed to the peripheral side walls by any technique commonly used in the art. Suitable techniques include heat sealing, ultrasonic sealing and the use of adhesives.

In a preferred embodiment, the upper portion may contain a positioning guide to aid filling in the filling point of the dispensing machine. Examples of suitable positioning guides include grooves, shoulders etc.

The reusable container may include any device or mechanism for refilling.

The collapsible portion of the reusable container may include any means of collapsing its structure including powered means through the action of a mechanism or motor and methods utilising a stored reservoir of energy such as, and by way of example, an elastic membrane, a spring, or a battery, from an external or internal source.

The reusable container may be collapsed manually by the consumer or user.

It will be appreciated by one skilled in the art, that the collapsible nature of said reusable container is not limited in the present invention.

The collapsible portion of the reusable container may comprise pleated, fluted or folded peripheral side walls that improve the degree to which the container may be made to collapse by providing a controlled means of collapse.

For example, said side walls may comprise vertically spaced steps or shoulders, which facilitate axial collapse and subsequent concentric folding of one or more portions of the side wall to provide a collapsed reusable container with at least two "layers" of side walls. Said side walls may be formed to give smooth, tapered or even straight peripheral side walls.

Alternative methods include those, wherein the reusable container comprises peripheral collapsible side walls in the form of a longitudinal compressible helical thread.

In one embodiment, the collapsible portion of the reusable container may comprise a collapsible bag or sachet.

In a further embodiment, the collapsible portion of the reusable container may comprise an expandable elastomeric material. Said expandable elastomeric material will automatically distend upon filling, and will be impermeable to the product contained therein. In a preferred embodiment, said expandable elastomeric material will contract upon dispense of the product therein. Thus, it is possible to avoid the necessity for machine or manual collapse of the reusable container after use. The expandable elastomeric material may be housed in a flexibility limiting support to restrict the amount of distension possible, for example by using an outer netting bag.

It is within the skill of the person skilled in the art to select a suitable elastomeric material according to their precise requirements.

In a preferred embodiment, the reusable container comprises a rigid upper portion. Said upper portion may conveniently comprise means for refilling and/or dispensing of product contained within said reusable container. Said upper portion may conveniently comprise means for transport of the reusable collapsible inner container, of any nature commonly used in the art.

In a preferred embodiment of the present invention, the reusable container may comprise one or more fill apertures and one or more dispense apertures, said fill apertures being remotely positioned on the container in relation to the dispense apertures.

By "remote" in the present invention, is meant at a location independent of the dispense aperture.

It will be appreciated that within the scope of the present invention, "remote" is also intended to encompass a situation wherein the fill aperture is located in the closure of the dispense aperture, that is to say, whilst the fill aperture shares a common path to the interior of the reusable container, the dispense aperture cannot be considered identical to that of the fill aperture.

The reusable container may comprise any number, combination and orientation of fill and/or dispense apertures that meet the needs of the product, its intended use or its method of use.

The reusable container may provide any means to communicate to the user the identity of the product it contains, and information about that product's state by means of, and by way of example, a transparent window, a gauge or a valve point for sampling.

Reusable containers according to the present invention may be conveniently used to store and transport a wide variety of materials such as foodstuffs, beverages, household products such as detergents, and automotive products.

BRIEF DESCRIPTION OF THE DRAWING

The present invention will now be described by way of example with reference to the accompanying drawings. It is to be noted, however, that the accompanying drawings illustrate only some embodiments of the invention and are therefore not to be considered limiting of its scope, because the invention may admit to other equally effective embodiments.

DETAILED DESCRIPTION OF THE INVENTION

Figure 1:
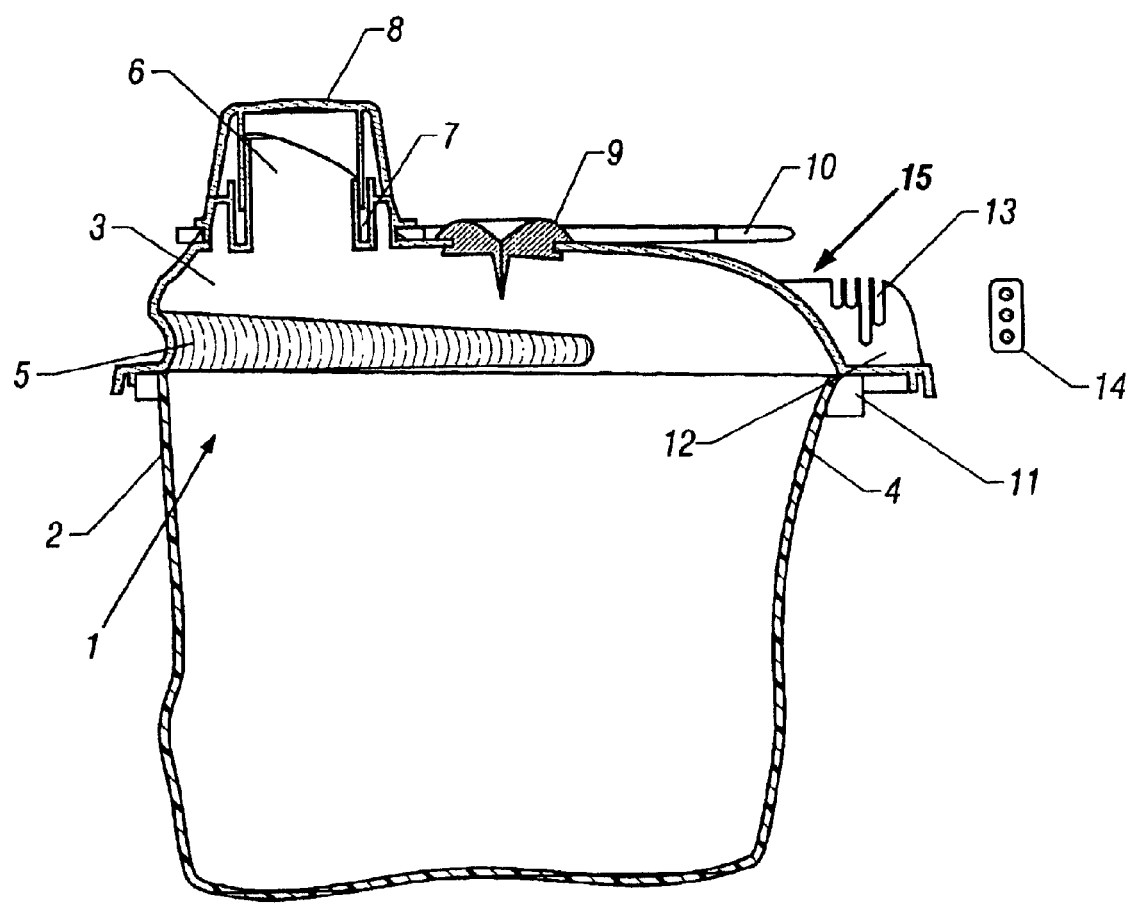
FIG. 1 is a fragmentary vertical cross-sectional view through a reusable container comprising an optical tag and in which also shown is the optical reader of a dispensing machine.

Referring to FIG. 1, there is shown a reusable container 1 comprising a collapsible bag 2 attached to a rigid upper portion 3 and having side walls 4.

Said upper portion 3 comprises a positioning guide 5, which is so designed to cooperate with suitable means in a dispensing apparatus so as to ensure that it is correctly positioned in said apparatus whilst being filled with product at the point of dispense (not shown).

Said upper portion 3 further comprises a dispense aperture in the form of a spout 6 with a drip trap 7, and covered by a double-walled lid 8.

Said upper portion 3 further comprises a remote fill aperture 9 in the form of a reed valve.

The reusable container 1 comprises a flexible carrying handle 10. The upper portion 3 is attached to the collapsible bag 2 by an ultrasonic seal 11.

The collapsible bag 2 includes an identification means 15. The identification means 15 can include a variety of identifying devices including those described in the Summary above. In one embodiment, the upper portion 3 can comprise a fin 12 with moulded grooves 13, which form an optical identification means that may be read by a reader 14 located in the filling point of a dispensing machine (not shown) in order to identify the reusable container and its contents.

Figure 2:
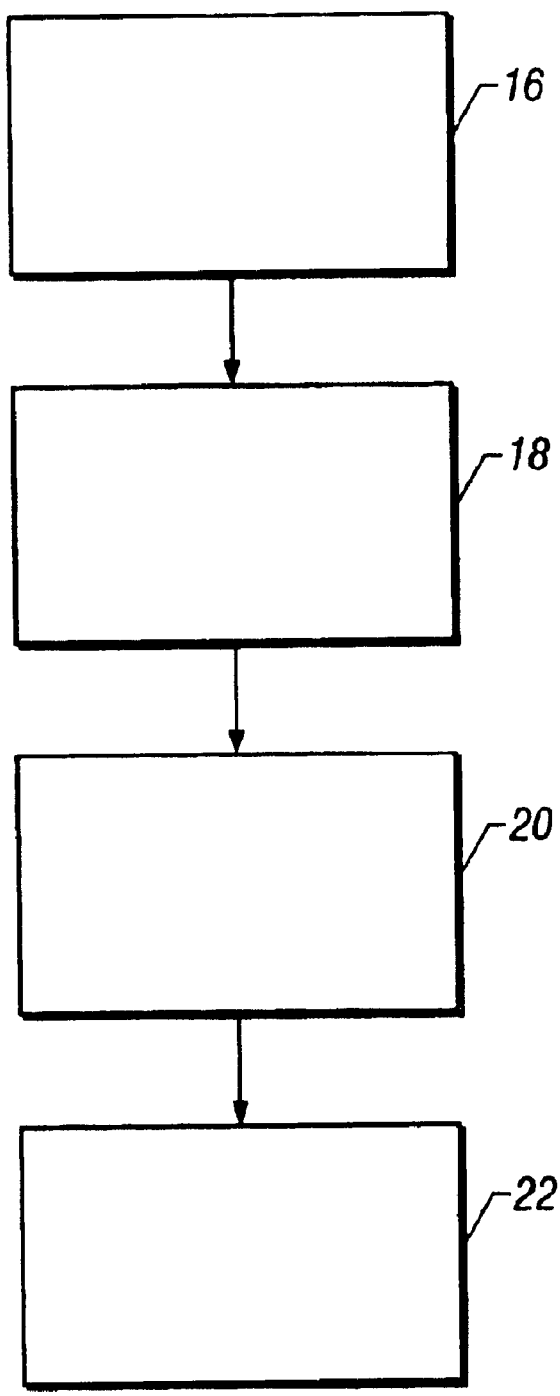
FIG. 2 is a schematic flowchart of a representative process using a reusable container showing FIG. 1.

FIG. 2 is a schematic flowchart of a representative process using a reusable container showing FIG. 1. In operation, the container such as the reusable container 1 shown in FIG. 1 can be inserted under or in a dispensing apparatus or otherwise associated therewith. The reader can read an identification means on the reusable container, as shown in step 16. The information can be stored in a storage means, such as a computer, or other data storage device, as shown in step 18. The information can be interrogated to extract the information depending on the various data needs associated with the interrogation, in step 20. Best described above, the information can include bind frequency, quantity, product, type, and product customisation characteristics. Further, the data can include direct billing of customers instead of through use of coins, notes/bills, or credit or debit cards. Further, the simplification of the machine dispensing products into the reusable container can be simplified by identifying the size of the usable container being used and signalling that the usable container is correcting positions to commence with dispensing. The information stored and interrogated can be processed in coins with step 22.

Other information that can be read, stored, and/or processed can include rote refilling control measures, identification of consumer or user, usable container's product history, use record, and other appropriate information.

While the foregoing is directed to various embodiments of the present invention, other and further embodiments may be devised without departing from the basic scope thereof. For example, the various methods and embodiments of the invention can be included in combination with each other to produce variations of the disclosed methods and embodiments. Also, the directions such as "top," "bottom," "left," "right," "upper," "lower," and other directions and orientations are described herein for clarity in reference to the figures and are not to be limiting of the actual device or system or use of the device or system. The device or system may be used in a number of directions and orientations. Further, the order of steps can occur in a variety of sequences unless otherwise specifically limited. The various steps described herein can be combined with other steps, interlineated with the stated steps, and/or split into multiple steps.

What is claimed is:

1. A portable reusable container for transporting household products, which comprises therein one or more readable identification means, the identification means comprising an updatable electronic intelligent tag adapted to be reprogrammable with information related to one or more household products consisting of detergents and cleaning products stored in the portable reusable container, the container comprising collapsible portion below a rigid upper portion, the collapsible portion having an impermeable interior for receiving the household products stored therein.

2. The reusable container of claim 1, wherein the collapsible portion comprises a collapsible bag or sachet.

3. The reusable container of claim 1, wherein the collapsible portion comprises pleated, fluted or folded peripheral side walls.

4. The reusable container of claim 1, wherein the collapsible portion comprises an expandable elastomeric material.

5. The reusable container of claim 1, wherein the reusable container comprises one or more fill apertures and one or more dispense apertures, the fill apertures being remotely positioned on the container in relation to the dispense apertures.

6. A container for providing information, comprising a portable reusable container for transporting household products, an identification means comprising an adaptable electronic intelligent tag coupled to the reusable container, and one or more fill apertures for refilling the reusable container with one or more household products consisting of detergents and cleaning products, wherein the electronic intelligent tag is adapted to be reprogrammed with information regarding the household products stored in the container.

7. The container of claim 6, wherein the identification means comprises a transponder.

8. The container of claim 6, wherein the identification means comprises data based on use of the reusable container.

9. A process for the monitoring and recordal of household product information during filling or refilling of a portable reusable container for transporting one or more household products, comprising:
   (a) reading an identification means comprising an adaptable electronic intelligent tag on the reusable container during filling or refilling of a reusable container with the household products consisting of detergents and cleaning products, the container comprising a collapsible portion having an impermeable interior for receiving the household products stored therein; and
   (b) storing the information obtained therefrom in a storage means that is capable of being interrogated to extract and optionally process the information.

10. The process of claim 9, wherein the reusable container is of a collapsible nature.

11. The process of claim 9, wherein the reusable container comprises an exterior collapsible bag or sachet.

12. The process of claim 9, wherein the reusable container comprises pleated, fluted or folded peripheral side walls.

13. The process of claim 9, wherein the reusable container comprises an xpandable elastomeric material.

14. The process of claim 9, wherein the reusable container comprises a rigid upper portion.

15. The process of claim 9, wherein the reusable container comprises one or more fill apertures and one or more dispense apertures, the fill apertures being remotely positioned on the container in relation to the dispense apertures.

16. A process for using an identification means, comprising:
   (a) providing one or more identification means comprising an adaptable electronic intelligent tag with a portable reusable container for transporting household products the container comprising collapsible portion having an impermeable interior for receiving the household products consisting of detergents and cleaning products stored therein; and
   (b) monitoring and recording household product information using the adaptable electronic intelligent tag during a refilling of the reusable container with one or more household products.

17. The process of claim 16, wherein the reusable container is of a collapsible nature.

18. The process of claim 17, wherein the reusable container comprises a rigid upper portion.

19. The process of claim 9, further comprising reprogramming the adaptable electronic intelligent tag with household product information.

20. The process of claim 16, further comprising reprogramming the adaptable electronic intelligent tag with changed household product information.

21. The process of claim 20, further comprising extracting the reprogrammed information and refilling the container based on the reprogrammed information.

22. A reusable container for household products, which comprises therein one or more readable identification means, the identification means comprising an updatable electronic intelligent tag adapted to be reprogrammable with information related to one or more household products stored in the reusable container, the container comprising an exterior collapsible portion below the rigid upper portion, the reusable container comprising one or more fill apertures and one or more dispense apertures, the fill apertures being remotely positioned on the container in relation to the dispense apertures.

23. A process for the monitoring and recordal of household product information during filling or refilling of a reusable container with one or more household products, comprising:
   (a) reading an identification means comprising an adaptable electronic intelligent tag on the reusable container during filling or refilling of a reusable container with the household products; and
   (b) storing the information obtained therefrom in a storage means that is capable of being interrogated to extract and optionally process the information, the reusable container comprising one or more fill apertures and one or more dispense apertures, the fill apertures being remotely positioned on the container in relation to the dispense apertures.

* * * * *